United States Patent
Xie et al.

(10) Patent No.: US 11,907,331 B1
(45) Date of Patent: Feb. 20, 2024

(54) METHOD AND SYSTEM FOR EVALUATING FRACTAL DIMENSION OF PARTICLE MATTER IN DISPERSING SYSTEM

(71) Applicant: HUAZHONG UNIVERSITY OF SCIENCE AND TECHNOLOGY, Hubei (CN)

(72) Inventors: Mingliang Xie, Hubei (CN); Yixiong Yang, Hubei (CN); Zhihao Jiang, Hubei (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 0 days.

(21) Appl. No.: 18/483,054

(22) Filed: Oct. 9, 2023

(30) Foreign Application Priority Data

Mar. 27, 2023 (CN) .......................... 202310303621.6

(51) Int. Cl.
  *G06F 17/18* (2006.01)
  *G06T 5/20* (2006.01)
  *G06T 5/00* (2006.01)

(52) U.S. Cl.
  CPC .............. *G06F 17/18* (2013.01); *G06T 5/002* (2013.01); *G06T 5/20* (2013.01); *G06T 2207/10056* (2013.01); *G06T 2207/20032* (2013.01)

(58) Field of Classification Search
  CPC . G06F 17/18; G06T 5/002; G06T 5/20; G06T 2207/10056; G06T 2207/20032
  (Continued)

(56) References Cited

U.S. PATENT DOCUMENTS

2004/0082074 A1* 4/2004 McGrath ................ G09B 23/20
436/171

FOREIGN PATENT DOCUMENTS

CN  1821746 A  8/2006
CN  106198321 A  12/2016
(Continued)

OTHER PUBLICATIONS

Notice of Grant issued in CN202310303621.6, dated Jun. 5, 2023, with English translation.
(Continued)

*Primary Examiner* — Tan V Mai
(74) *Attorney, Agent, or Firm* — Hamre, Schumann, Mueller & Larson, P.C.

(57) ABSTRACT

Disclosed in the present invention are a method and system for evaluating a fractal dimension of particle matter in a dispersing system. The method includes: setting that distribution of a particle radius r of particle matter in a dispersing system obeys logarithmic normal distribution $\ln r \sim N(\mu, \sigma^2)$ with an expectation $\mu$ and a standard deviation $\sigma$, and determining the value of the standard deviation $\sigma$; and evaluating a fractal dimension $D_f$ of the dispersing system on the basis of the standard deviation $\sigma$, an evaluation formula being: $D_f = 1/\sigma$. The present invention provides the formula for evaluating the fractal dimension of particle distribution in a dispersing system. When the formula is used to calculate a fractal dimension, only particle radius distribution of particle matter needs to be measured, and no geometrical morphology feature parameter of the particle matter needs to be measured. Factors such as particle morphology and the like do not affect the fractal dimension. Therefore, the measurement method of the present invention can reduce an error resulting from experimental measurements, can acquire a fractal dimension of particle matter
(Continued)

S100

Acquire a standard deviation $\sigma$ of a particle radius $r$ of particle matter in a dispersing system in logarithmic normal distribution

S200

Evaluate a fractal dimension $D_f$ of the dispersing system on the basis of the standard deviation $\sigma$, an evaluation formula being $D_f = \dfrac{1}{\sigma}$ quickly and efficiently, and is especially adapted to data analysis of a dispersion system and a particle swarm.

10 Claims, 3 Drawing Sheets

(58) Field of Classification Search
USPC .......................................................... 708/200
See application file for complete search history.

(56) References Cited

FOREIGN PATENT DOCUMENTS

| CN | 111766261 A | | 10/2020 |
|----|-------------|---|---------|
| CN | 114778391 A | * | 7/2022 |

OTHER PUBLICATIONS

Lind et al., "Basic Statistics for Business & Economics", Original ISBN: 978-0-07-131807-5, with English translation of Abstract.
Office Action issued in CN202310303621.6, dated May 4, 2023, with English translation.

* cited by examiner

Acquire a standard deviation $\sigma$ of a particle radius $r$ of particle matter in a dispersing system in logarithmic normal distribution ——S100

Evaluate a fractal dimension $D_f$ of the dispersing system on the basis of the standard deviation $\sigma$, an evaluation formula being $D_f = \frac{1}{\sigma}$ ——S200

METHOD AND SYSTEM FOR EVALUATING FRACTAL DIMENSION OF PARTICLE MATTER IN DISPERSING SYSTEM

TECHNICAL FIELD

The present invention belongs to the technical field of measurement of a fractal dimension of particle matter in a dispersing system, and more specifically, to a method and system for evaluating a fractal dimension of particle matter in a dispersing system.

BACKGROUND ART

The fractal dimension is a measure of irregularity of a complex shape, and may be considered the ratio of a fractal body to a space occupied thereby. The particle size distribution and fractal dimension of a dispersing system indicate the degree of uniformity of particle composition, are indicative of the overall distribution of the particle size of the particle matter, and are directly related to physical properties of the particle matter such as the specific surface area and the like. As the fractal dimension of particle matter decreases, the specific surface area thereof increases, so does the adorability, thereby doing greater harm to the human body when the particles are absorbed thereby. Moreover, the particle size distribution and the fractal dimension of the particle matter also affect the climate, the environment, and the like. Hence, determining the fractal dimension of particulate matter in a dispersing system holds significant value in assessing environmental quality.

Currently, measurement of the particle size distribution and the fractal dimension of particle matter mainly involves techniques such as experimental observation, computational simulation, image recognition, and the like. The principles of implementing these methods include both aspects. The morphology of different samples is first observed by means of a microscope to acquire particle images of the different samples, and the fractal dimension thereof is calculated by using different models to fit the particle distribution or by directly using computer image recognition techniques. This process has two factors that affect the accuracy of the final result. One factor is the microscope image precision. As the precision of the microscope improves, the effect of a slight perturbation thereon increases, resulting in more noise points on images, thereby affecting subsequent observations and computational processing. The other factor is methods for calculating the fractal dimension. The methods for calculating the fractal dimension mainly include the structured walk method, the box-counting dimension method, the radius-of-gyration method, and the like. The structured walk method is manual measurement, and less data is acquired thereby and said data is not precise. Currently, the box-counting dimension method is commonly used. In this method, the size of the box is extremely important to a final result thereof. As the box becomes smaller, a calculation result is more precise, but a huge amount of computer memory is consumed. In addition, the calculation precision of this method is severely affected by the particle morphology. In the radius-of-gyration method, it is assumed that the particles are spherical, and the density is uniform. The radius-of-gyration method assumes spherical particles with uniform density and calculates the radius of gyration based on statistics of primary particle size and position. However, this method relies on precise measurements of primary particle size and position, making the process complex and prone to errors.

SUMMARY OF THE INVENTION

In view of the above defects in the prior art or improvement requirements, provided in the present invention are a method and system for evaluating a fractal dimension of particle matter in a dispersing system, in order to acquire a fractal dimension of an entire dispersing system efficiently and accurately.

In order to achieve the above objective, according to an aspect of the present invention, provided is a method for evaluating a fractal dimension of particle matter in a dispersing system, comprising:

acquiring a standard deviation $\sigma$ of a particle radius r of the particle matter in the dispersing system in logarithmic normal distribution; and evaluating the fractal dimension $D_f$ of the dispersing system based on the standard deviation $\sigma$, an evaluation formula being:

$$D_f = \frac{1}{\sigma}.$$

In an embodiment, the acquiring a standard deviation $\sigma$ of a particle radius r of the particle matter in the dispersing system in logarithmic normal distribution comprises:

particle radius distribution determination: determining the particle radius $r_i$ of the particle matter in the dispersing system and a particle content $p_i$ of the particle matter having the particle radius $r_i$; and fitting: fitting particle radius distribution of the particle matter in the dispersing system by using a standard logarithmic normal distribution function, so as to determine an expectation $\mu$ and a standard deviation $\sigma$ in the logarithmic normal distribution function, the form of the logarithmic normal distribution function being:

$$f(r) = \frac{1}{r\sqrt{2\pi}\sigma} e^{-\frac{(\ln r - \ln \mu)^2}{2\sigma^2}}$$

wherein, $f(r)$ is a distribution probability density function of the particle radius r.

In an embodiment, the acquiring a standard deviation $\sigma$ of a particle radius r of the particle matter in the dispersing system in logarithmic normal distribution comprises:

particle radius distribution determination: determining the particle radius $r_i$ of the particle matter in the dispersing system and a particle content $p_i$ of the particle matter having the particle radius $r_i$; and first calculation: calculating an expectation $E(r)$ and a variance $D(r)$ of particle radius distribution of the particle matter in the dispersing system, calculation formulas being:

$$E(r) = \sum_{i=1}^{n} r_i p_i$$

$$D(r) = \sum_{i=1}^{n} [r_i - E(r)]^2 p_i$$

and second calculation: calculating the standard deviation σ of the particle radius distribution of the particle matter on the basis of the calculated expectation E(r) and variance D(r), a calculation formula being:

$$\sigma = \sqrt{\ln\left[1 + \frac{D(r)}{E(r)^2}\right]}$$

wherein, n is the number of particle radii of the particle matter.

In an embodiment, the particle radius distribution determination is implemented by using a laser particle sizer.

In an embodiment, the particle radius distribution determination is implemented on the basis of computer image recognition, comprising:

step S110, acquiring a microscopic image by means of a microscopic image capture card;

step S120, removing background or environmental noise by means of median filtering;

step S130, reprocessing the image by means of 0-1 integer optimization;

step S140, marking a connected domain of a particle and the position of a central point thereof according to a seed fill algorithm in the graph theory; and step S150, calculating the particle radius of the marked particle on the basis of the equivalence principle, and storing the same in a data structure, wherein the equivalence principle refers to using the area of the marked connected domain as the area of a circle, and calculating the radius as an equivalent radius of the corresponding particle, and the particle radius $r_i$ of the particle matter and the particle content $p_i$ of the particle matter having the particle radius $r_i$ are acquired according to stored data of the data structure.

In an embodiment, the fitting comprises:

dividing the particle radii into several ranges, counting the number of particles in each range, drawing a particle size distribution diagram, and performing polynomial fitting and optimization on a particle size distribution curve by using a least square method, to acquire the logarithmic normal distribution function of the particle radius distribution.

A system for evaluating a fractal dimension of particle matter in a dispersing system, comprising:

a distribution parameter calculation module, for acquiring a standard deviation σ of a particle radius r of the particle matter in the dispersing system in logarithmic normal distribution; and a fractal dimension calculation module, for evaluating the fractal dimension $D_f$ of the dispersing system on the basis of the standard deviation σ, an evaluation formula being:

$$D_f = \frac{1}{\sigma}.$$

In an embodiment, the distribution parameter calculation module comprises:

a particle radius distribution determination unit, for determining the particle radius $r_i$ of the particle matter in the dispersing system and a particle content $p_i$ of the particle matter having the particle radius $r_i$; and a fitting unit, for fitting particle radius distribution of the particle matter in the dispersing system by using a standard logarithmic normal distribution function, so as to determine an expectation μ and a standard deviation σ in the logarithmic normal distribution function, the form of the logarithmic normal distribution function being:

$$f(r) = \frac{1}{r\sqrt{2\pi}\sigma} e^{-\frac{(\ln r - \ln \mu)^2}{2\sigma^2}}$$

wherein, ƒ(r) is a distribution probability density function of the particle radius r.

In an embodiment, the distribution parameter calculation module comprises:

a particle radius distribution determination unit, for determining the particle radius $r_i$ of the particle matter in the dispersing system and a particle content $p_i$ of the particle matter having the particle radius $r_i$;

a first calculation unit, for calculating an expectation E(r) and a variance D(r) of particle radius distribution of the particle matter in the dispersing system, calculation formulas being:

$$E(r) = \sum_{i=1}^{n} r_i p_i$$

$$D(r) = \sum_{i=1}^{n} [r_i - E(r)]^2 p_i$$

and a second calculation unit, for calculating the standard deviation σ of the particle radius distribution of the particle matter based on the calculated expectation E(r) and variance D(r), a calculation formula being:

$$\sigma = \sqrt{\ln\left[1 + \frac{D(r)}{E(r)^2}\right]}$$

wherein, n is the number of particle radii of the particle matter.

In an embodiment, the particle radius distribution determination unit comprises:

a filtering subunit, for performing median filtering on a microscopic image acquired by means of a microscopic image capture card, so as to remove background or environmental noise;

an integer optimization subunit, for reprocessing the filtered image by means of 0-1 integer optimization;

a marking subunit, for marking a connected domain of a particle and the position of a central point thereof according to a seed fill algorithm in the graph theory; and an equivalent radius calculation subunit, for calculating the particle radius of the marked particle based on the equivalence principle, and storing the same in a data structure, wherein the equivalence principle refers to using the area of the marked connected domain as the area of a circle, and calculating the radius as an equivalent radius of the corresponding particle.

In general, compared with the prior art, the technical solutions proposed in the present invention can achieve the following beneficial effects:

The present invention provides the formula for evaluating the fractal dimension of particle distribution in a dispersing system. When the formula is used to calculate a fractal dimension, only particle radius distribution of particle matter needs to be measured, and no geometrical morphology feature parameter of the particle matter needs to be measured. Factors such as particle morphology and the like do not affect the fractal dimension. Therefore, the measurement method of the present invention can reduce an error resulting from experimental measurements, can acquire a fractal dimension of particle matter quickly and efficiently, and is especially adapted to data analysis of a dispersion system and a particle swarm.

BRIEF DESCRIPTION OF THE DRAWINGS

FIG. 1 is a flowchart of steps of a method for evaluating a fractal dimension of particle matter in a dispersing system according to an embodiment.

FIG. 2 is a microscopic image captured by means of a microscope according to an embodiment.

DETAILED DESCRIPTION

Figure 3:
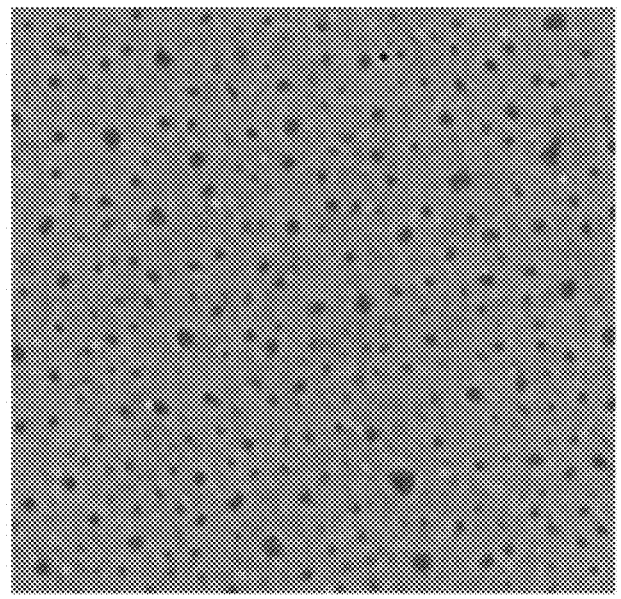
FIG. 3 is an image having undergone median filtering according to an embodiment.

To make the purpose, technical solution, and advantages of the present invention clearer, the present invention is further described in detail below in connection with the accompanying drawings and embodiments. It should be understood that the specific embodiments described herein are only used to explain the present invention, but not to limit the present invention. In addition, the technical features involved in various embodiments of the present invention described below can be combined with each other as long as they do not constitute a conflict therebetween.

A mixture acquired by dispersing one (or more) substance in other one (or more) substance is collectively referred to as a dispersing system. For example, smoke, dust, haze, and the like commonly found in life are dispersing systems formed by solid particles and gaseous media. Cloud and mist are dispersing systems formed by droplets of liquid water and gaseous media. Further, some other aerosols, suspensions, and the like are all dispersing systems.

FIG. 1 is a flowchart of steps of a method for evaluating a fractal dimension of particle matter in a dispersing system according to an embodiment. The method mainly includes the following two steps:

Step S100: acquiring a standard deviation $\sigma$ of a particle radius r of particle matter in a dispersing system in logarithmic normal distribution.

It is set that particle radius distribution of the particle matter in the dispersing system obeys logarithmic normal distribution $\ln x \sim N(\mu, \sigma^2)$ with an expectation $\mu$ and the standard deviation $\sigma$, and the value of the standard deviation $\sigma$ is determined.

Step S200: evaluating the fractal dimension $D_f$ of the dispersing system on the basis of the standard deviation $\sigma$, an evaluation formula being $D_f = 1/\sigma$.

In the present invention, the calculation formula of the fractal dimension is derived on the basis of the principle of maximum entropy. The principle of maximum entropy is a fundamental principle in mathematics and physics, but has not been used to analyze the fractal dimension.

An analysis process of the fractal dimension is described below briefly.

First, a standard logarithmic normal distribution function is selected as a fit function of the particle radius distribution of the particles. The expression of the function is:

$$f(r) = \frac{1}{r\sqrt{2\pi}\sigma} e^{-\frac{(\ln r - \ln \mu)^2}{2\sigma^2}}$$

where, $f(r)$ represents a distribution probability density function of the particle radius r, and the particle radius r is the radius calculated by using the area occupied by the particle as the area of a circle.

It can be understood that the selecting the standard logarithmic normal distribution function as the fit function of the particle radius distribution of the particles is essentially setting that particle radius distribution of the particle matter in the dispersing system obeys logarithmic normal distribution $\ln r \sim N(\mu, \sigma^2)$ with an expectation $\mu$ and the standard deviation $\sigma$.

The Boltzmann entropy is then introduced into the dispersing system, and the following expression of entropy can be acquired:

$$S = -k_B \frac{\phi}{u} \int_0^\infty f(r) \ln f(r) dv$$

where, $k_B$ is the Boltzmann constant, $\phi$ and u are respectively feature parameters, v is the volume, and the relationship between the volume v and the distribution of the particle radius r is $v \propto r^{D_f}$.

On the basis of this, an entropy and fractal dimension expression can be acquired by means of analysis, thereby deriving that the fractal dimension meets the following condition in the case of maximum entropy:

$$D_f = \frac{1}{\sigma}$$

In the present invention, the logarithmic normal distribution function is selected as the fit function of the particle radius distribution of the particles, and the principle of maximum entropy is applied to the analysis of the fractal dimension. Finally, the calculation formula of the fractal dimension is acquired by means of analysis. It can be seen that the fractal dimension $D_f$ can be calculated by determining only the parameter $\sigma$.

Two specific methods for determining the parameter σ are provided herein.

In a first method, the value of σ is determined on the basis of fitting: the particle radius distribution of the particle matter in the dispersing system is fit by using the standard logarithmic normal distribution function, so as to determine the unknown parameters μ and σ in the logarithmic normal distribution function. Specifically, a sample particle image of the dispersing system may be acquired and input into a fitting model, and a fit function is set in the fitting model to fit the logarithmic normal distribution. In this case, the parameters μ and σ in the logarithmic normal distribution function are unknown, and after fitting is performed, the values of the parameters μ and σ therein can be determined.

In a second method, the parameter σ is calculated directly according to a formula. If the distribution of the particle radius r obeys logarithmic normal distribution $\ln r \sim N(\mu, \sigma^2)$ with an expectation μ and the standard deviation σ, and the mathematical expectation and variance thereof are respectively:

$$E(r) = e^{\mu + \sigma^2/2}$$

$$D(r) = (e^{\sigma^2} - 1)e^{2\mu + \sigma^2}$$

The expression of the parameter σ can be acquired by means of combination:

$$\sigma = \sqrt{\ln\left[1 + \frac{D(r)}{E(r)^2}\right]}$$

Therefore, the second method can first determine a particle radius $r_i$ of the particle matter in the dispersing system and a particle content $p_i$ of the particle matter having the particle radius $r_i$, and then calculate the expectation E(r) and the variance D(r) of the particle radius distribution of the particle matter in the dispersing system. Calculation formulas are:

$$E(r) = \sum_{i=1}^{n} r_i p_i$$

$$D(r) = \sum_{i=1}^{n} [r_i - E(r)]^2 p_i$$

Finally, the standard deviation σ of the particle radius distribution of the particle matter is calculated on the basis of the calculated expectation E(r) and variance D(r).

Specifically, a particle radius distribution determination step may be performed first: determining the particle radius $r_i$ of the particle matter in the dispersing system and a particle content $p_i$ of the particle matter having the particle radius $r_i$. After determination, the first method may be used to perform fitting directly to acquire the logarithmic normal distribution function, so as to acquire the value of the standard deviation σ. Alternatively, the second method may be used to directly calculate the value of the standard deviation σ by means of the formula.

In an embodiment, the particle radius $r_i$ of the particle matter in the dispersing system and the particle content $p_i$ of the particle matter having the particle radius $r_i$ may be determined by using a laser particle sizer. Specifically, the laser particle sizer may be a combined dry and wet laser particle sizer, preferably a fully automated combined dry and wet laser particle sizer of Sympatec of Germany, i.e., a fully automated combined dry and wet laser particle sizer of the model HELOS/OASIS.

The laser particle sizer performs dilution treatment and the like on a sample, so that the original structure of the sample is damaged, and it is difficult to perform measurement multiple times. Therefore, in another embodiment, also provided is a particle radius distribution determination method employing computer image recognition. The method mainly includes the following steps:

Step S110, acquiring a microscopic image by means of a microscopic image capture card.

FIG. 2 shows a microscopic image captured by means of a microscope.

Step S120, removing background or environmental noise by means of median filtering.

FIG. 3 shows an image having undergone median filtering.

Step S130, reprocessing the image by means of 0-1 integer optimization.

Figure 4:
FIG. 4 is an image having undergone 0-1 optimization according to an embodiment.

FIG. 4 shows an image having undergone 0-1 optimization.

Step S140, computer image recognition: marking a connected domain of a particle and the position of a central point thereof according to a seed fill algorithm in the graph theory.

Figure 5:
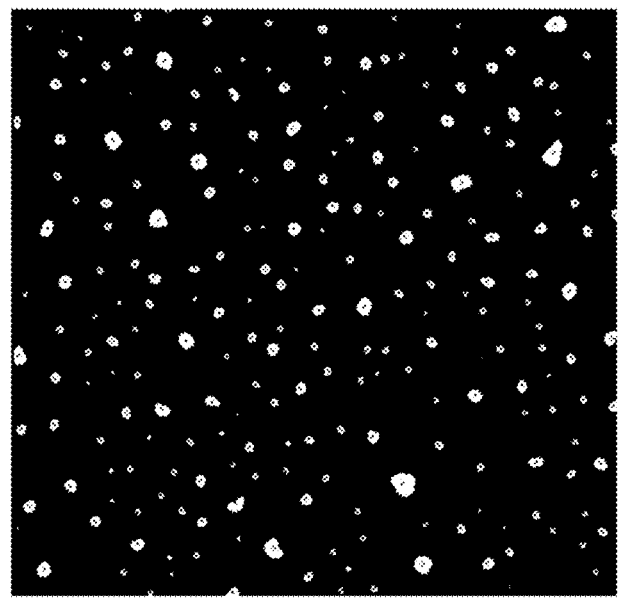
FIG. 5 is an image showing marking of a central position of each particle and a connected domain thereof according to an embodiment.

FIG. 5 shows marking of a central position of each particle and a connected domain thereof.

Step S150, calculating an equivalent radius of the marked particle on the basis of the equivalence principle, and storing the same in a data structure.

The equivalence principle refers to using the area of the marked connected domain as the area of a circle, and calculating the radius as the equivalent radius of the corresponding particle.

By means of step S110 to step S150, the particle radius distribution of the particles, including the particle radii of the particle matter and the particle content of the particle matter of each particle radius, can be acquired. Then, the value of the standard deviation σ can be acquired by means of fitting or direct formula calculation.

In an embodiment, after step S150, the following step is further performed to implement fitting to acquire the logarithmic normal distribution function of the particle radius distribution:

Step S160, dividing the particle radii into several ranges, counting the number of particles in each range, drawing a particle size distribution diagram, and performing polynomial fitting and optimization on a particle size distribution curve by using a least square method, to acquire the logarithmic normal distribution function of the particle radius distribution.

Figure 6:
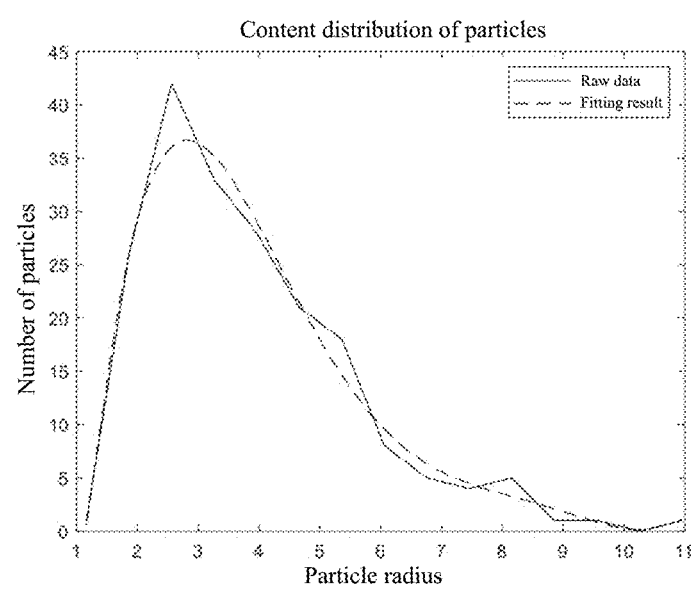
FIG. 6 is a particle size distribution diagram before fitting and a particle size distribution diagram after fitting according to an embodiment.

FIG. 6 is a particle size distribution diagram before fitting and a particle size distribution diagram after fitting.

Correspondingly, the present invention also relates to a system for evaluating a fractal dimension of particle matter in a dispersing system, including:

a distribution parameter calculation module, for acquiring a standard deviation σ of a particle radius r of the particle matter in the dispersing system in logarithmic normal distribution; and a fractal dimension calculation module, for evaluating the fractal dimension $D_f$ of the dispersing system on the basis of the standard deviation σ, an evaluation formula being $$D_f = \frac{1}{\sigma}.$$

The distribution parameter calculation module may specifically determine the parameter $\sigma$ by using two methods.

A first method includes: fitting particle radius distribution of the particle matter in the dispersing system by using a standard logarithmic normal distribution function, so as to determine an expectation $\mu$ and a standard deviation $\sigma$ in the logarithmic normal distribution function, the form of the logarithmic normal distribution function being:

$$f(r) = \frac{1}{r\sqrt{2\pi}\sigma} e^{-\frac{(\ln r - \ln \mu)^2}{2\sigma^2}}$$

where, $f(r)$ is a distribution probability density function of the particle radius r.

A second method includes: calculating an expectation $E(r)$ and a variance $D(r)$ of the particle radius distribution of the particle matter in the dispersing system according to a particle radius $r_i$ of the particle matter in the dispersing system and a particle content $p_i$ of the particle matter having the particle radius $r_i$, and calculating a standard deviation $\sigma$ of the particle radius distribution of the particle matter according to the expectation $E(r)$ and the variance $D(r)$, where calculation formulas of the expectation $E(r)$, the variance $D(r)$, and the standard deviation $\sigma$ are:

$$E(r) = \sum_{i=1}^{n} r_i p_i$$

$$D(r) = \sum_{i=1}^{n} [r_i - E(r)]^2 p_i$$

$$\sigma = \sqrt{\ln\left[1 + \frac{D(r)}{E(r)^2}\right]}$$

where, n is the number of particle radii of the particle matter.

Therefore, in an embodiment, the distribution parameter calculation module includes:

a particle radius distribution determination unit, for determining the particle radius $r_i$ of the particle matter in the dispersing system and a particle content $p_i$ of the particle matter having the particle radius $r_i$; and a fitting unit, for fitting particle radius distribution of the particle matter in the dispersing system by using a standard logarithmic normal distribution function, so as to determine an expectation $\mu$ and a standard deviation $\sigma$ in the logarithmic normal distribution function, the form of the logarithmic normal distribution function being:

$$f(r) = \frac{1}{r\sqrt{2\pi}\sigma} e^{-\frac{(\ln r - \ln \mu)^2}{2\sigma^2}}$$

where, $f(r)$ is a distribution probability density function of the particle radius r.

In another embodiment, the distribution parameter calculation module includes:

a particle radius distribution determination unit, for determining the particle radius $r_i$ of the particle matter in the dispersing system and a particle content $p_i$ of the particle matter having the particle radius $r_i$;

a first calculation unit, for calculating an expectation $E(r)$ and a variance $D(r)$ of particle radius distribution of the particle matter in the dispersing system, calculation formulas being:

$$E(r) = \sum_{i=1}^{n} r_i p_i$$

$$D(r) = \sum_{i=1}^{n} [r_i - E(r)]^2 p_i$$

and a second calculation unit, for calculating the standard deviation $\sigma$ of the particle radius distribution of the particle matter on the basis of the calculated expectation $E(r)$ and variance $D(r)$, a calculation formula being:

$$\sigma = \sqrt{\ln\left[1 + \frac{D(r)}{E(r)^2}\right]}$$

where, n is the number of particle radii of the particle matter.

In an embodiment, the particle radius distribution determination unit includes:

a filtering subunit, for performing median filtering on a microscopic image acquired by means of a microscopic image capture card, so as to remove background or environmental noise;

an integer optimization subunit, for reprocessing the filtered image by means of 0-1 integer optimization;

a marking subunit, for marking a connected domain of a particle and the position of a central point thereof according to a seed fill algorithm in the graph theory; and an equivalent radius calculation subunit, for calculating an equivalent radius of the marked particle based on the equivalence principle, and storing the same in a data structure, wherein the equivalence principle refers to using the area of the marked connected domain as the area of a circle, and calculating the radius as the equivalent radius of the corresponding particle.

The present invention is verified below via three sets of data.

(1) Data 1: calculation of contents and fractal dimensions of different particles in a hot shrub. Data source: LAN Longyan et al., Soil Particle Radius Distribution and Fractal Features of Different Types of Grassland in Gannan [J], Journal of Jiangxi Agricultural University, 2022.

| Radius r/μm | p | $r_i p_i$ | $(r_i - E(r))^2 p_i$ |
|---|---|---|---|
| 0.6258 | 0.00695 | 0.00435 | 2.763762 |
| 30.2755 | 0.31141 | 9.42812 | 29.34447 |
| 14.4858 | 0.13234 | 1.91705 | 4.896064 |
| 21.1158 | 0.24635 | 5.20186 | 0.073858 |
| 15.5332 | 0.17464 | 2.71272 | 4.427427 |
| 11.9111 | 0.09669 | 1.15164 | 7.24629 |
| 4.8227 | 0.03162 | 0.15252 | 7.84043 |

Calculation performed in the present invention according to the above data results in: E(r)=20.56825, D(r)=56.5923, σ=0.35433, and $D_f$=2.822232. The measurement result in the literature is 2.92, and a difference therebetween is 0.1. The data measurement has a certain error per se. The result of the present invention and the result of the literature meet requirements on errors. However, the method of the present invention is obviously faster.

(2) Data 2: calculation of contents and fractal dimensions of different particles in hot grass. Data source: LAN Longyan et al., Soil Particle Radius Distribution and Fractal Features of Different Types of Grassland in Gannan [J], Journal of Jiangxi Agricultural University, 2022.

| Radius r/μm | p | $r_i p_i$ | $(r_i - E(r))^2 p_i$ |
|---|---|---|---|
| 0.9808 | 0.010713564 | 0.010507863 | 4.291207188 |
| 29.6015 | 0.313119062 | 9.268793916 | 23.19714911 |
| 13.2228 | 0.127653123 | 1.687931716 | 7.709739208 |
| 24.5369 | 0.245300182 | 6.018906034 | 3.078543599 |
| 16.7178 | 0.173842733 | 2.906268041 | 3.179295105 |
| 10.1431 | 0.097533859 | 0.989295684 | 11.48444199 |
| 3.5362 | 0.031837477 | 0.112583687 | 9.703579128 |

Calculation performed in the present invention according to the above data results in: E(r)=20.99428694, D(r)=62.64395533, σ=0.364544108, and $D_f$=2.743152279. The fractal dimension calculated by using this method is 2.74. The calculation result in the literature is about 2.9 (the literature states that the measurement of the particle content in the data has an error, and some impurities are included). The error of the result of the present invention and the error of the result of the literature are within a reasonable range.

(3) Data 3: FAN Dongye et al., Indoor and Outdoor Particle Matter Pollution Status and Particle Size Distribution Features of Dormitory Buildings in Different Seasons [J], Heating Ventilating & Air Conditioning, 2022.

| Radius r/μm | p | $r_i p_i$ | $(r_i - E(r))^2 p_i$ |
|---|---|---|---|
| 0.5 | 0.824503642 | 0.412251821 | 0.002825552 |
| 0.75 | 0.166018158 | 0.124513619 | 0.006085694 |
| 1.75 | 0.007881872 | 0.013793275 | 0.011188917 |
| 3.75 | 0.001197246 | 0.004489674 | 0.01219445 |
| 7.5 | 0.000199541 | 0.001496558 | 0.009614659 |
| 10 | 0.000199541 | 0.001995411 | 0.017787321 |

Calculation performed in the present invention according to the above data results in: E(r)=0.558540357, D(r)=0.059696592, σ=0.418439411, and $D_f$=2.389832254. In this set of data, the fractal dimension of the pollutant provided in the literature is 2.24, and the fractal dimension calculated by using this method is about 2.38. The reason is that the content of particle matter having the radius less than 0.5 μm is huge, but cannot be accurately measured. Therefore, a certain error occurs. The error of the result is also within an allowable range.

In conclusion, the present invention provides the formula for evaluating the fractal dimension of particle distribution in a dispersing system. When the formula is used to calculate a fractal dimension, only particle radius distribution of particle matter needs to be measured, and no geometrical morphology feature parameter of the particle matter needs to be measured. Factors such as particle morphology and the like do not affect the fractal dimension. Therefore, the measurement method of the present invention can reduce an error resulting from experimental measurements, can acquire a fractal dimension of particle matter quickly and efficiently, and is especially adapted to data analysis of a dispersion system and a particle swarm.

It can be easily understood by those skilled in the art that the foregoing description is only preferred embodiments of the present invention and is not intended to limit the present invention. All the modifications, identical replacements and improvements within the spirit and principle of the present invention should be in the scope of protection of the present invention.

The invention claimed is:

1. A method for evaluating a fractal dimension of particle matter in a dispersing system, the method comprising:
setting that distribution of a particle radius r of particle matter in a dispersing system obeys logarithmic normal distribution lnr~N(μ, σ²) with an expectation μ and a standard deviation σ, acquiring a standard deviation σ of a particle radius r of the particle matter in the dispersing system in logarithmic normal distribution; and
evaluating the fractal dimension $D_f$ of the dispersing system on the basis of the standard deviation σ, an evaluation formula being:

$$D_f = \frac{1}{\sigma}.$$

2. The method for evaluating the fractal dimension of the particle matter in the dispersing system according to claim 1, wherein the acquiring a standard deviation σ of a particle radius r of the particle matter in the dispersing system in logarithmic normal distribution comprises:
particle radius distribution determination: determining the particle radius $r_i$ of the particle matter in the dispersing system and a particle content $p_i$ of the particle matter having the particle radius $r_i$; and
fitting: fitting particle radius distribution of the particle matter in the dispersing system by using a standard logarithmic normal distribution function, so as to determine an expectation μ and a standard deviation σ in the logarithmic normal distribution function, the form of the logarithmic normal distribution function being:

$$f(r) = \frac{1}{r\sqrt{2\pi}\sigma} e^{-\frac{(\ln r - \ln \mu)^2}{2\sigma^2}}$$

wherein, $f(r)$ is a distribution probability density function of the particle radius r.

3. The method for evaluating the fractal dimension of the particle matter in the dispersing system according to claim 2, wherein the particle radius distribution determination is implemented by using a laser particle sizer.

4. The method for evaluating the fractal dimension of the particle matter in the dispersing system according to claim 2, wherein the particle radius distribution determination is implemented on the basis of computer image recognition, comprising:

step S110, acquiring a microscopic image by means of a microscopic image capture card;

step S120, removing background or environmental noise by means of median filtering;

step S130, reprocessing the image by means of 0-1 integer optimization;

step S140, marking a connected domain of a particle and the position of a central point thereof according to a seed fill algorithm in the graph theory; and step S150, calculating the particle radius of the marked particle on the basis of the equivalence principle, and storing the same in a data structure, wherein the equivalence principle refers to using the area of the marked connected domain as the area of a circle, and calculating the radius as an equivalent radius of the corresponding particle, and the particle radius $r_i$ of the particle matter and the particle content $p_i$ of the particle matter having the particle radius $r_i$ are acquired according to stored data of the data structure.

5. The method for evaluating the fractal dimension of the particle matter in the dispersing system according to claim 2, wherein the fitting comprises:

dividing the particle radii into several ranges, counting the number of particles in each range, drawing a particle size distribution diagram, and performing polynomial fitting and optimization on a particle size distribution curve by using a least square method, to acquire the logarithmic normal distribution function of the particle radius distribution.

6. The method for evaluating the fractal dimension of the particle matter in the dispersing system according to claim 1, wherein the acquiring a standard deviation σ of a particle radius r of the particle matter in the dispersing system in logarithmic normal distribution comprises:

particle radius distribution determination: determining the particle radius $r_i$ of the particle matter in the dispersing system and a particle content $p_i$ of the particle matter having the particle radius $r_i$;

first calculation: calculating an expectation $E(r)$ and a variance $D(r)$ of particle radius distribution of the particle matter in the dispersing system, calculation formulas being:

$$E(r) = \sum_{i=1}^{n} r_i p_i$$

$$D(r) = \sum_{i=1}^{n} [r_i - E(r)]^2 p_i$$

and second calculation: calculating the standard deviation σ of the particle radius distribution of the particle matter on the basis of the calculated expectation $E(r)$ and variance $D(r)$, a calculation formula being:

$$\sigma = \sqrt{\ln\left[1 + \frac{D(r)}{E(r)^2}\right]}$$

wherein, n is the number of particle radii of the particle matter.

7. A system for evaluating a fractal dimension of particle matter in a dispersing system, characterized by comprising:

a distribution parameter calculation module, for acquiring a standard deviation σ of a particle radius r of the particle matter in the dispersing system in logarithmic normal distribution, setting that distribution of a particle radius r of particle matter in a dispersing system obeys logarithmic normal distribution $\ln r \sim N(\mu, \sigma^2)$ with an expectation μ and a standard deviation σ; and a fractal dimension calculation module, for evaluating the fractal dimension $D_f$ of the dispersing system on the basis of the standard deviation σ, an evaluation formula being:

$$D_f = \frac{1}{\sigma}.$$

8. The system for evaluating the fractal dimension of the particle matter in the dispersing system according to claim 7, wherein the distribution parameter calculation module comprises:

a particle radius distribution determination unit, for determining the particle radius $r_i$ of the particle matter in the dispersing system and a particle content $p_i$ of the particle matter having the particle radius $r_i$; and a fitting unit, for fitting particle radius distribution of the particle matter in the dispersing system by using a standard logarithmic normal distribution function, so as to determine an expectation μ and a standard deviation σ in the logarithmic normal distribution function, the form of the logarithmic normal distribution function being:

$$f(r) = \frac{1}{r\sqrt{2\pi}\sigma} e^{-\frac{(\ln r - \ln \mu)^2}{2\sigma^2}}$$

wherein, $f(r)$ is a distribution probability density function of the particle radius r.

9. The system for evaluating the fractal dimension of the particle matter in the dispersing system according to claim 8, wherein the particle radius distribution determination unit comprises:

a filtering subunit, for performing median filtering on a microscopic image acquired by means of a microscopic image capture card, so as to remove background or environmental noise;

an integer optimization subunit, for reprocessing the filtered image by means of 0-1 integer optimization;

a marking subunit, for marking a connected domain of a particle and the position of a central point thereof according to a seed fill algorithm in the graph theory; and an equivalent radius calculation subunit, for calculating the particle radius of the marked particle on the basis of the equivalence principle, and storing the same in a data structure, wherein the equivalence principle refers to using the area of the marked connected domain as the area of a circle, and calculating the radius as an equivalent radius of the corresponding particle.

10. The system for evaluating the fractal dimension of the particle matter in the dispersing system according to claim 7, wherein the distribution parameter calculation module comprises:
- a particle radius distribution determination unit, for determining the particle radius $r_i$ of the particle matter in the dispersing system and a particle content $p_i$ of the particle matter having the particle radius $r_i$;
- a first calculation unit, for calculating an expectation $E(r)$ and a variance $D(r)$ of particle radius distribution of the particle matter in the dispersing system, calculation formulas being:

$$E(r) = \sum_{i=1}^{n} r_i p_i$$

$$D(r) = \sum_{i=1}^{n} [r_i - E(r)]^2 p_i$$

and a second calculation unit, for calculating the standard deviation $\sigma$ of the particle radius distribution of the particle matter on the basis of the calculated expectation $E(r)$ and variance $D(r)$, a calculation formula being:

$$\sigma = \sqrt{\ln\left[1 + \frac{D(r)}{E(r)^2}\right]}$$

wherein, n is the number of particle radii of the particle matter.

* * * * *